United States Patent [19]

Schorr et al.

[11] Patent Number: 5,232,185
[45] Date of Patent: Aug. 3, 1993

[54] METHOD AND APPARATUS FOR MOUNTING A COMPACT OPTICAL SCANNER

[75] Inventors: Theodore H. Schorr, Eugene, Oreg.; William C. McRight, Round Rock, Tex.; Phillip C. Gummeson, Eugene, Oreg.

[73] Assignee: Spectra-Physics, Inc., San Jose, Calif.

[21] Appl. No.: 539,377

[22] Filed: Jun. 15, 1990

Related U.S. Application Data

[63] Continuation of Ser. No. 294,339, Jan. 6, 1989, abandoned.

[51] Int. Cl.⁵ .................................................. G12B 9/00
[52] U.S. Cl. ..................... 248/27.3; 248/220.2
[58] Field of Search ............... 248/27.1, 27.3, 220.2, 248/904; 235/462; D14/114, 116

[56] References Cited

U.S. PATENT DOCUMENTS

| | | | |
|---|---|---|---|
| 3,902,048 | 8/1975 | Fleischer et al. | 235/61.11 E |
| 3,928,759 | 12/1975 | Sansone | 250/568 |
| 3,941,965 | 3/1976 | Piber | 248/27.3 X |
| 3,988,573 | 10/1976 | Hayosh et al. | 235/61.11 E |
| 3,995,166 | 11/1976 | Hobart et al. | 250/566 |
| 4,006,343 | 2/1977 | Izura et al. | 235/61.11 E |
| 4,093,865 | 6/1978 | Nickl | 250/566 |
| 4,097,729 | 6/1978 | Seligman et al. | 235/467 |
| 4,211,905 | 7/1980 | Quigley | 248/27.3 X |
| 4,318,537 | 3/1982 | Dorman et al. | 248/27.1 X |
| 4,561,615 | 12/1985 | Medlin, Jr. | 248/27.1 |
| 4,713,532 | 12/1987 | Knowles | 235/467 |
| 4,762,984 | 8/1988 | Knowles et al. | |
| 4,812,133 | 3/1989 | Fleak et al. | 248/27.3 X |

Primary Examiner—David A. Scherbel
Assistant Examiner—Daniel Hulseberg
Attorney, Agent, or Firm—Lyon & Lyon

[57] ABSTRACT

A method and apparatus for mounting a compact optical scanner utilizes a one or two-piece mounting bracket to secure the scanner. A bevelled surface on the inside of the bracket cooperated with a conversely bevelled surface on the scanner to prevent removal of the scanner through the top surface of the bracket. Flexible extensions support the scanner and flex out of the way to allow insertion and removal of the scanner.

9 Claims, 10 Drawing Sheets

METHOD AND APPARATUS FOR MOUNTING A COMPACT OPTICAL SCANNER

This application is a continuation of application Ser. No. 294,339, filed Jan. 6, 1989, now abandoned.

BACKGROUND OF THE INVENTION

1. Field of the Invention

This invention relates to the field of optical scanning and particularly to bar code laser scanners. More particularly it relates an apparatus for and a method of mounting a compact bar code laser scanner in a horizontal orientation.

2. Description of Related Arts

Laser bar code readers (or "bar code laser scanners" as used herein) in the prior art are disclosed generally in, for example, U.S. Pat. No. 4,713,532 ("the Knowles patent") and U.S. Pat. No. 4,093,865 ("the Nickl patent"). Recently, a class of compact bar code laser scanners has been introduced, for example, see U.S. Pat. No. 4,799,164 which is assigned to Spectra-Physics, Inc. and fully incorporated herein by reference. Such compact scanners are relatively lightweight compared to earlier style bar code laser scanners and have a depth of approximately less than seven inches. Prior art scanners were typically mounted in a fixed point of sale location and were generally not considered portable. Compact scanners, on the other hand, are highly portable, can be utilized in a number of different orientations, and provide flexibility to users in that they can be moved from location to location within a sales establishment or other user facility with little difficulty. As a consequence, a need exists for a method and apparatus for mounting a compact optical scanner so that it may be conveniently used.

SUMMARY OF THE INVENTION

The present invention comprises method and apparatus for removably mounting a compact optical scanner. A mounting bracket is provided which is adapted to fit into a cutout in a horizontal counter or vertical wall or other appropriate surface. The mounting bracket is adapted to receive the compact optical scanner and retain it against movement relative to the cutout. An additional feature can prevent the removal of the scanner through the face of the bracket coextensive with the surface.

Accordingly, it is an object of this invention to provide a method and apparatus for firmly but removably mounting a compact optical scanner in a cutout in a surface.

It is a further object of this invention to provide a method and apparatus for making the compact optical scanner theft-resistant while mounted in a mounting bracket according to the present invention.

It is a further object of this invention to provide a simple one-piece mounting bracket for a compact optical scanner.

Other and further objects and advantages of the present invention will appear hereinafter.

DESCRIPTION OF THE PREFERRED EMBODIMENT

Figure 1:
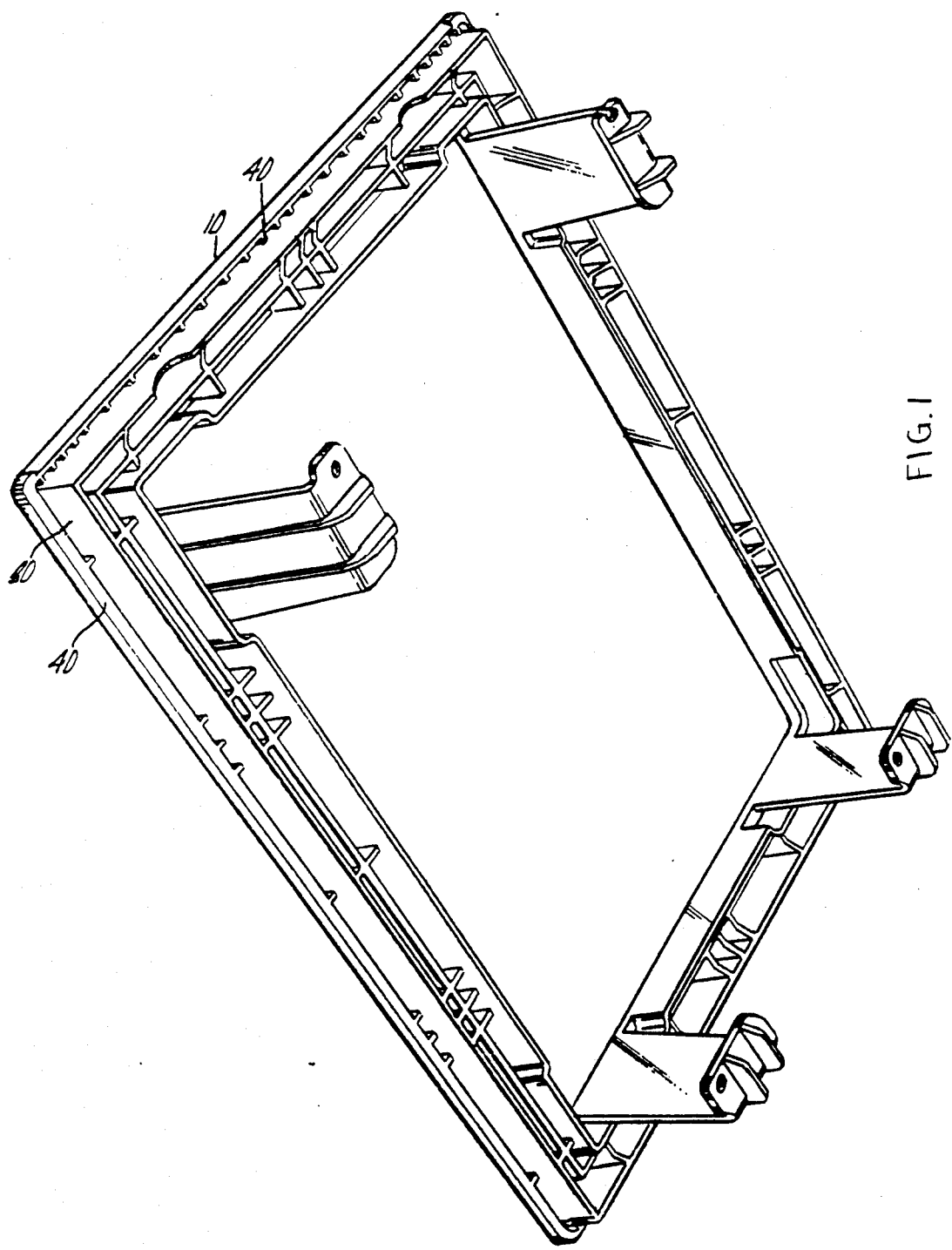
FIG. 1 is a bottom perspective view of a first preferred embodiment of the mounting bracket for a compact optical scanner.
Figure 2:
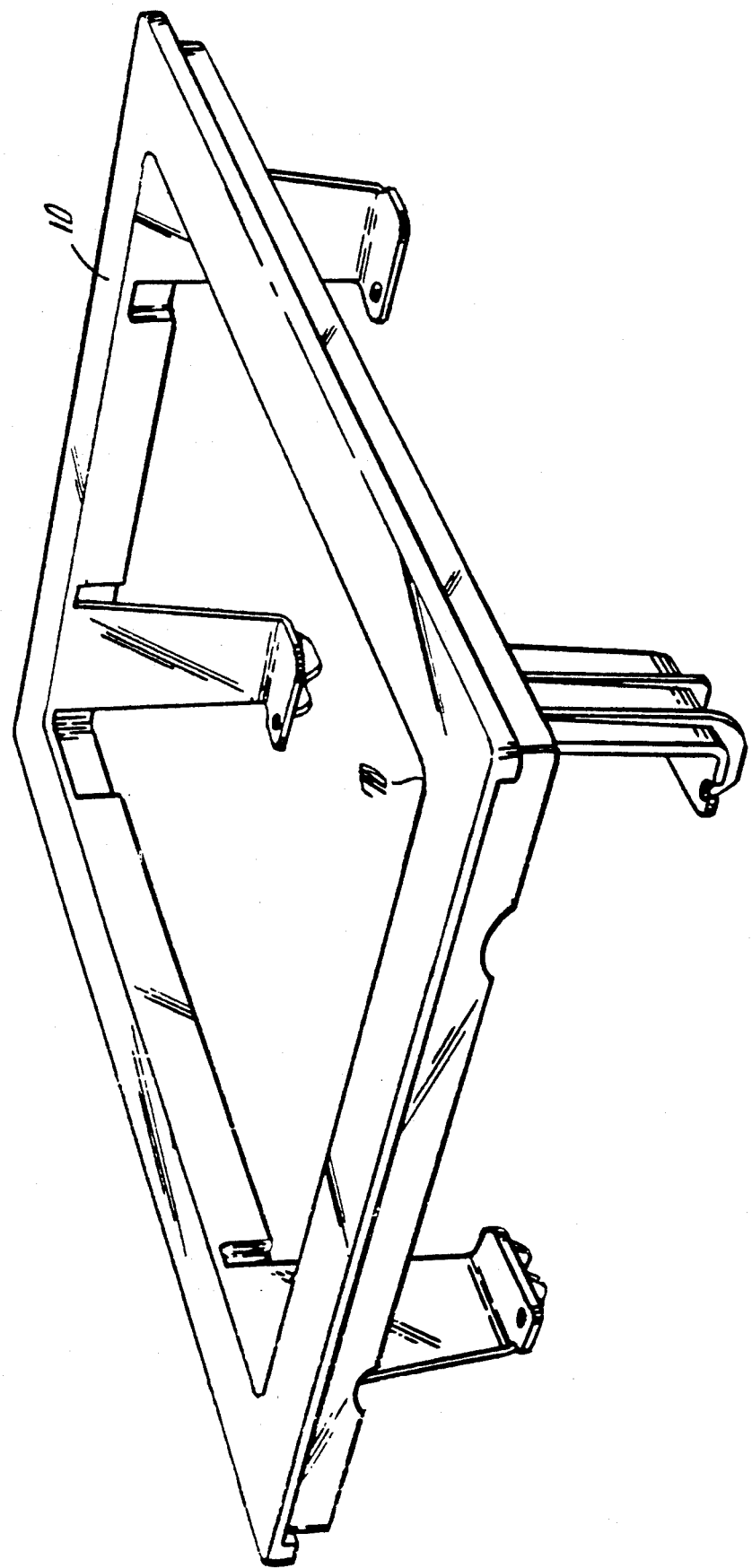
FIG. 2 is a top perspective view of a first preferred embodiment of the mounting bracket for a compact optical scanner.
Figure 3:
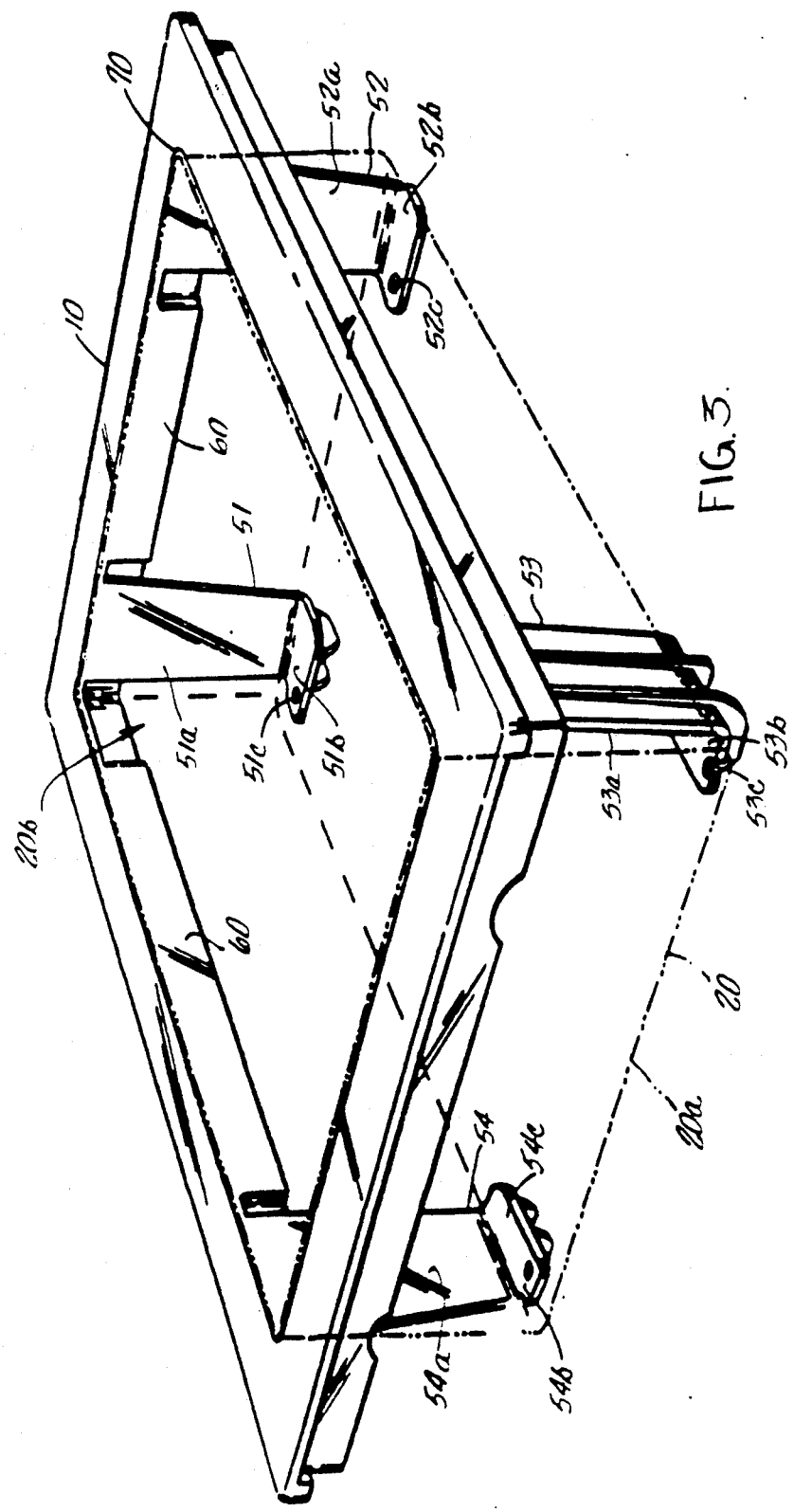
FIG. 3 is a top perspective view of a first preferred embodiment of the mounting bracket for a compact optical scanner showing the optical scanner inserted into the bracket in outline.
Figure 4:
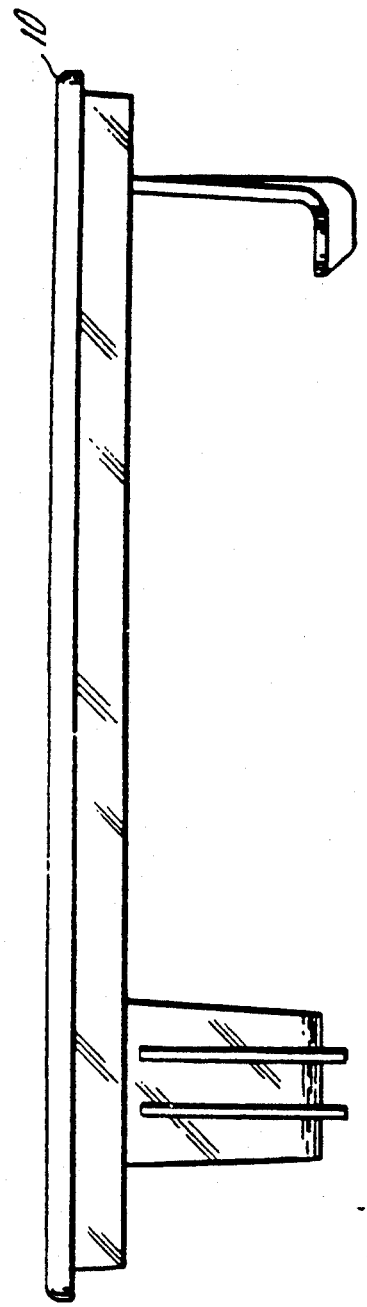
FIGS. 4-5 are side views of a first preferred embodiment of the mounting bracket for a compact optical scanner.
Figure 5:
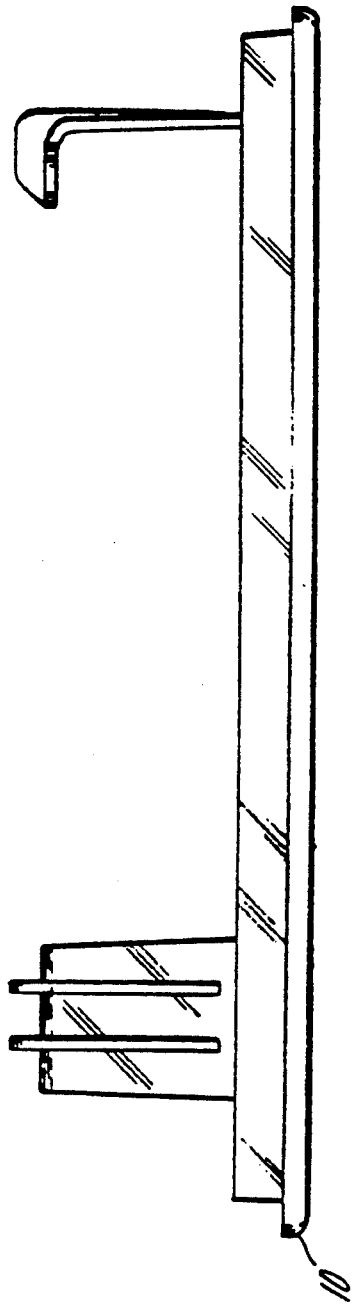
Figure 7:
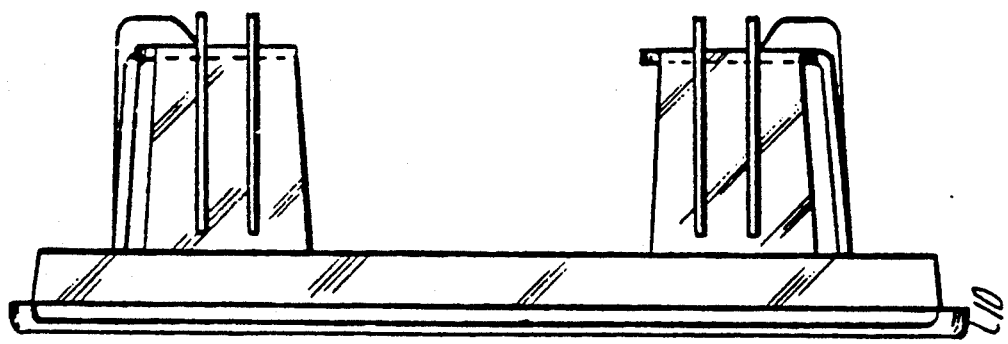
FIG. 7 is a back view of a first preferred embodiment of the mounting bracket for a compact optical scanner.
Figure 6:
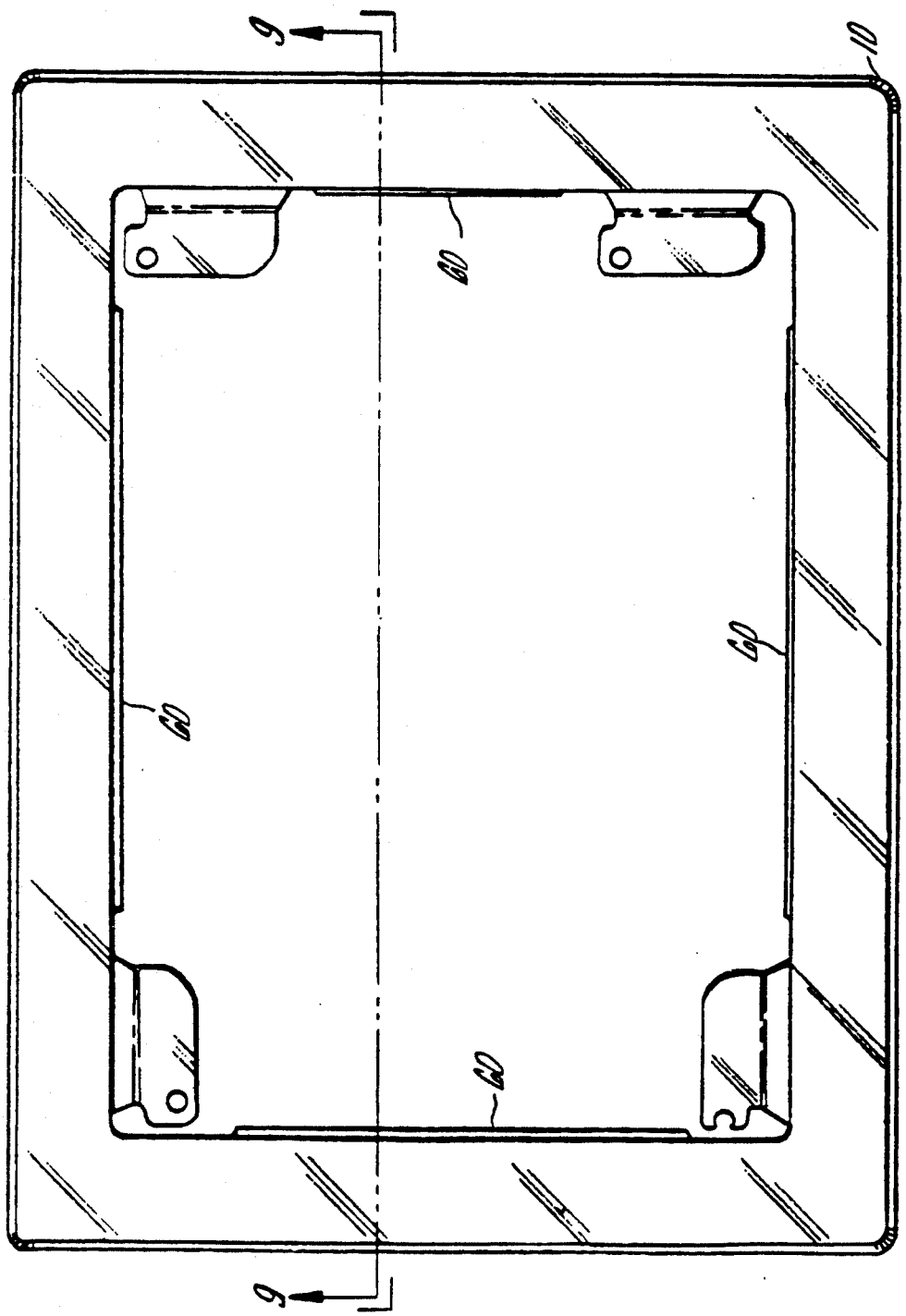
FIG. 6 is a top view of a first preferred embodiment of the mounting bracket for a compact optical scanner.
Figure 8:
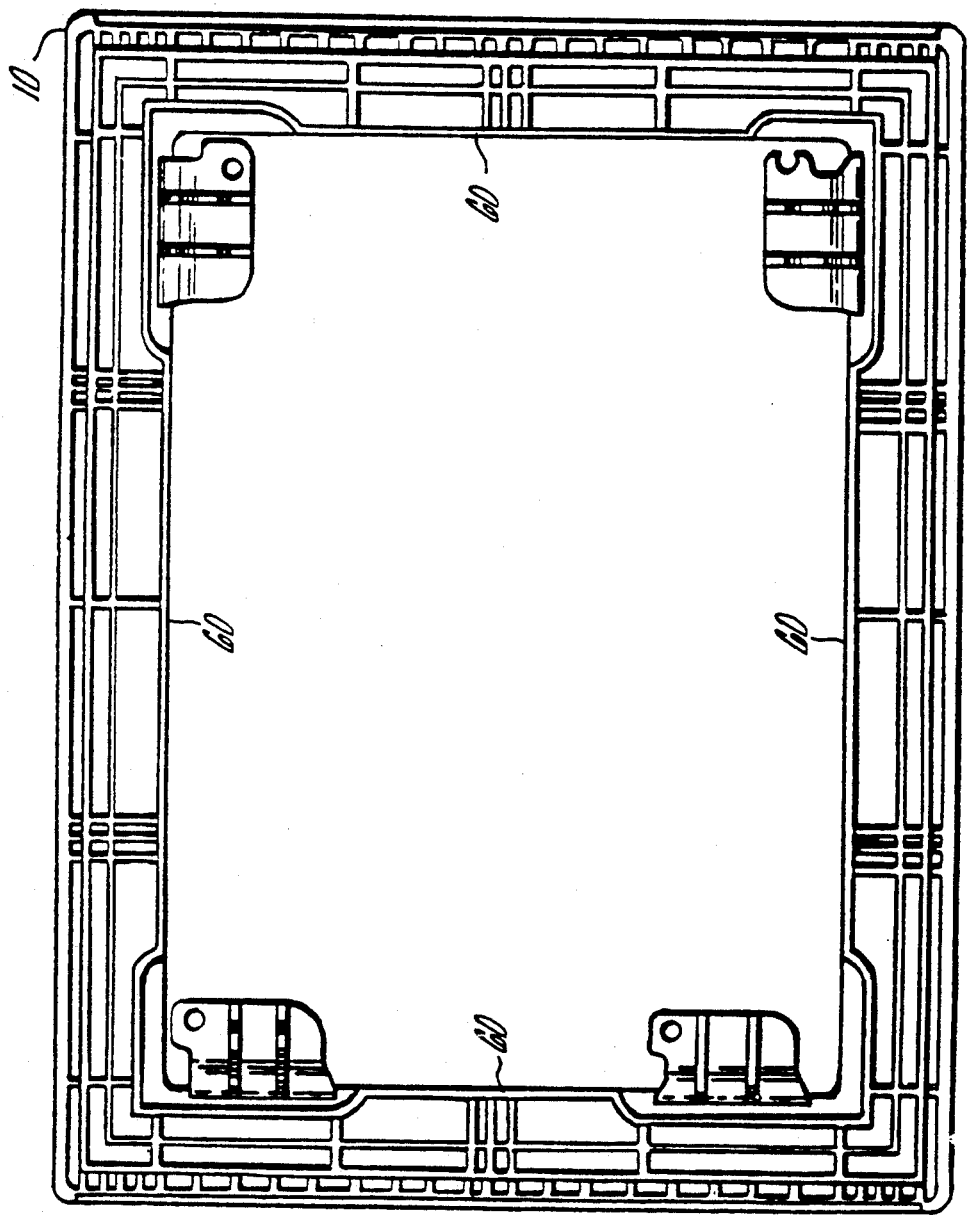
FIG. 8 is a bottom view of a first preferred embodiment of the mounting bracket for a compact optical scanner.
Figure 9:
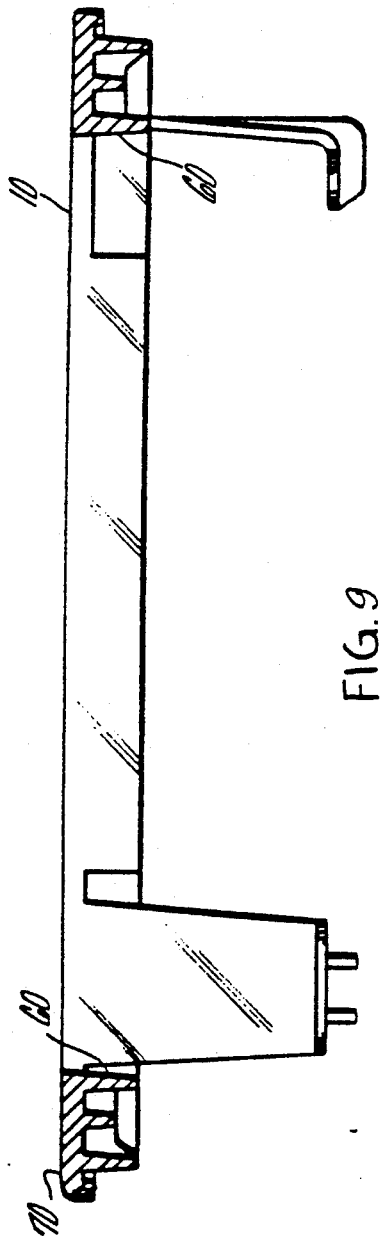
FIG. 9 is a cross-sectional view taken along lines 9—9 of FIG. 6 of a first preferred embodiment of the mounting bracket for a compact optical scanner.
Figure 10:
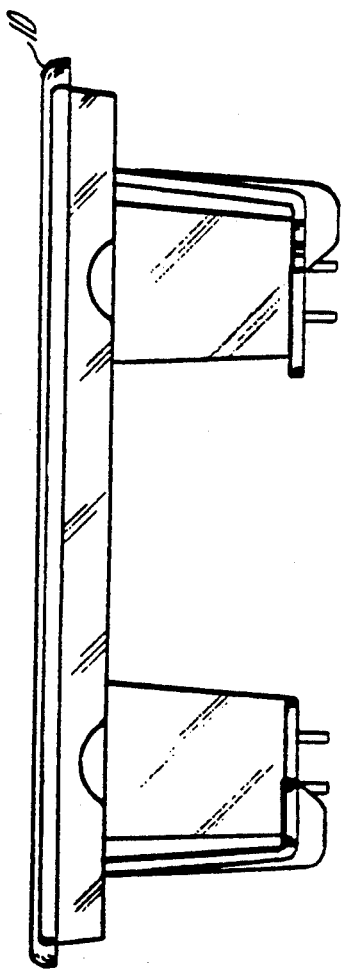
FIG. 10 is a front view of a first preferred embodiment of the mounting bracket for a compact optical scanner.

In a first preferred embodiment of the present invention as depicted in FIGS. 1-10, a compact optical scanner is provided with a mounting bracket 10 shown in FIG. 1 for mounting the optical scanner in a cutout in a surface. FIG. 3 depicts the optical scanner 20 in outline within the mounting bracket 10. In a preferred embodiment, mounting bracket 10 is fabricated of a single piece of injection-molded plastic such as the polycarbonate G. E. Lexan BE 3030 which is available from the General Electric Company, or an equivalent. Injection molding techniques are well known to those of skill in the art. The mounting bracket 10 may be attached to a surface in at least three ways. First, as in a preferred embodiment, the mounting bracket may be simply dropped through a cutout in a horizontal surface, as in a checkout counter at a market, the cutout to conform with rim 30 so that bracket 10 may drop through the cutout up to lip 40. Lip 40 is configured to restrain the bracket from falling through the cutout. Optionally, a suitable gasket may be provided between lip 40 and the surface of the counter adjacent the cutout. Second, similar to the first method, the lip 40 may be glued, if desired, with an appropriate adhesive to the surface material surrounding the cutout. Such gluing may make removal difficult. Third, receptacles for bolts, or threaded bolts (not shown) may be incorporated into the bracket 10 so that the bracket 10 may be bolted to the surface material surrounding the cutout, either with or without the addition of a suitable gasket between lip 40 and the surface material surrounding the cutout.

As shown in, for example, FIG. 3, four projections or "feet" 51, 52, 53 and 54 are provided on the bracket 10. Each foot 51, 52, 53 and 54 has a flexible extension portion 51a, 52a, 53a and 54a, a support surface portion 51b, 52b, 53b and 54b, and a mounting hole 51c, 52c, 53c and 54c. In a preferred embodiment, as depicted in FIG. 3, the scanner 20 is fitted into the bracket by flexing members 53a and 54a outward from the center of the bracket so that the scanner may slide into the bracket 10. The scanner is supported at its bottom 20a by support surface portions 51b, 52b, 53b and 54b which may be secured to the scanner 20 by bolts through mounting holes 51c, 52c, 53c and 54c. The scanner 20 is supported at its top 20b by inner bracket rim 60 which is shown in cross-section in FIG. 9. In a preferred embodiment, inner bracket rim 60 consists of four flanges 60 depending from the top surface 70 of the bracket. Each flange depends more than 90 degrees from top surface 70 so as to slope downwardly and outwardly and outwardly from top surface 70. In a preferred embodiment, the angle, known as the "draft angle" between the vertical and the slope of flanges 60 is two degrees. The draft angle cooperates with the outer wall shape of the scanner 20 to prevent the scanner from being removable through the top surface 70 of the bracket. This feature aids in preventing theft of scanners as well as further securing the scanner to the bracket. An additional feature (not shown) which is incorporated in a preferred embodiment is to provide a metal bracket with cable tie points affixed between mounting hole 54c and 51c to provide strain relief for the electrical cables connected to the optical scanner 20.

Figure 11:
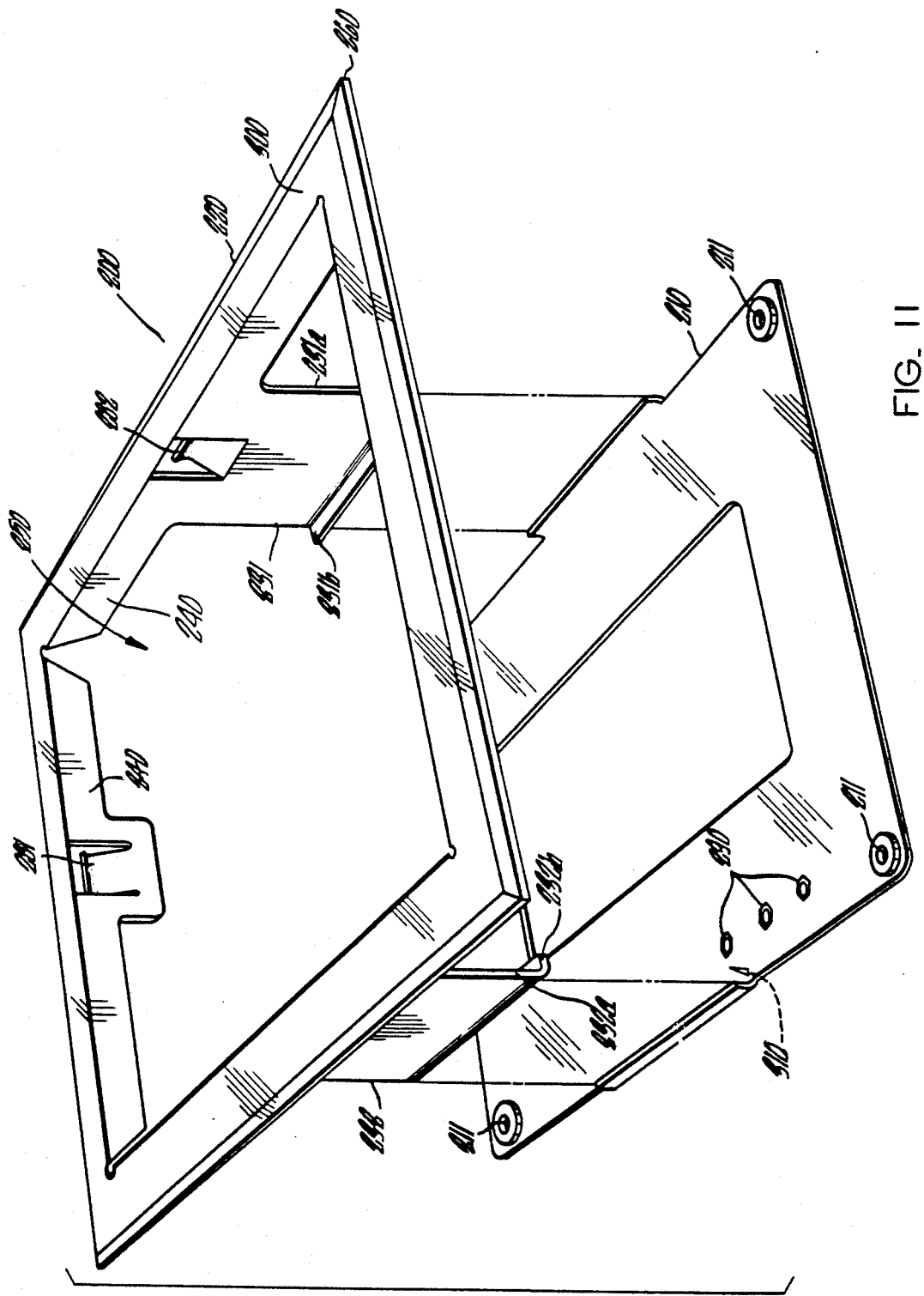
FIG. 11 is a top perspective exploded view of a second preferred embodiment of the mounting bracket for a compact optical scanner.
Figure 14:
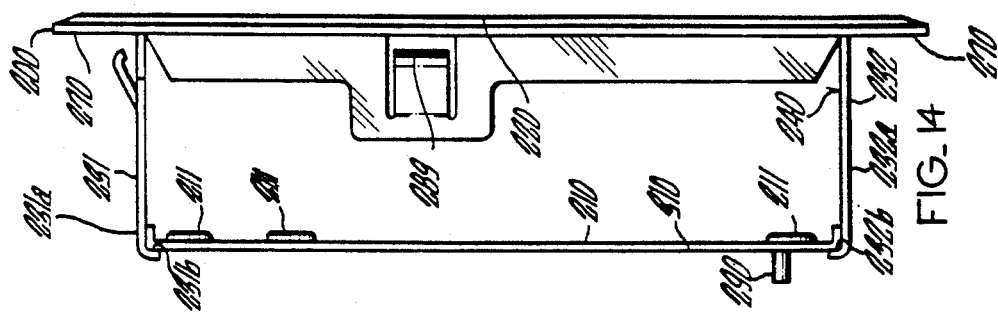
FIG. 14 is a side view of a second preferred embodiment of the mounting bracket for a compact optical scanner.
Figure 13:
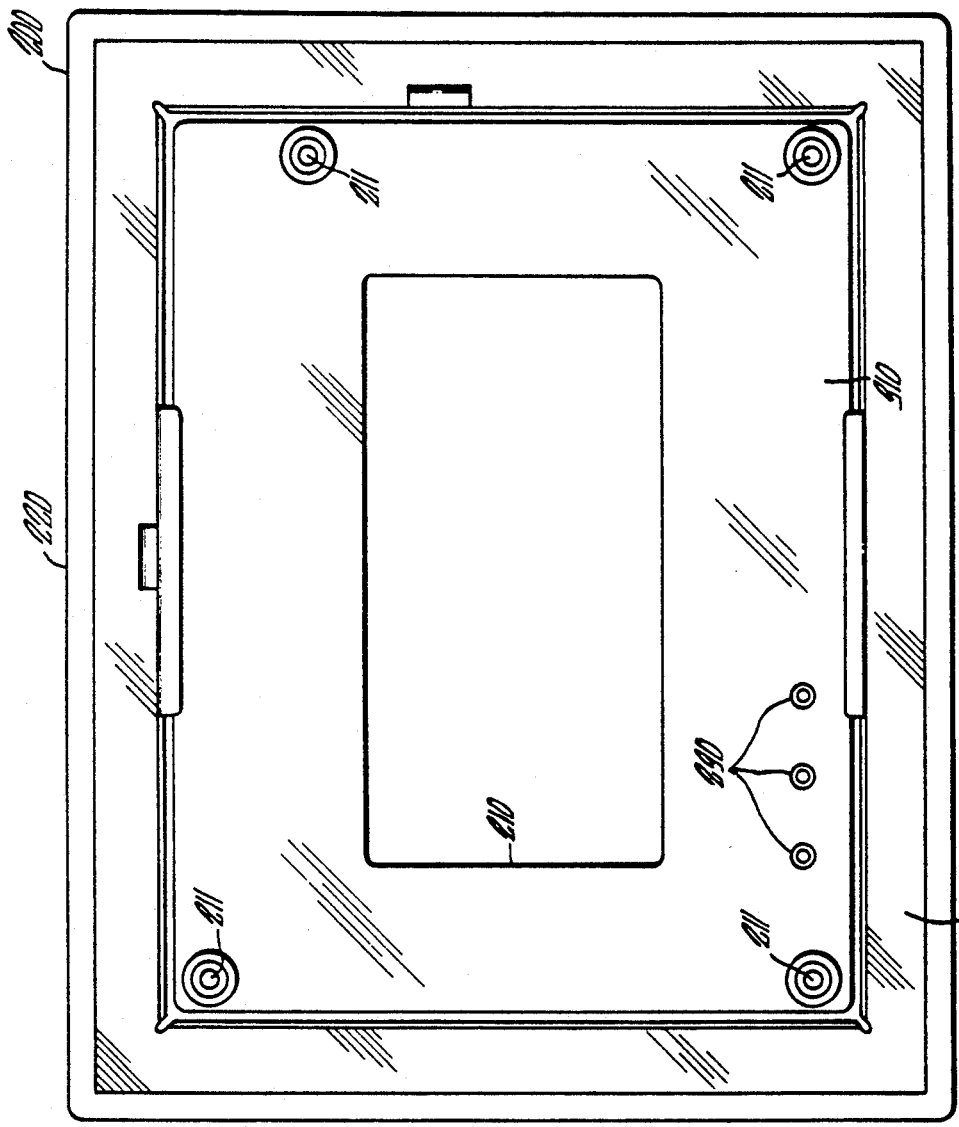
FIG. 13 is a bottom view of a second preferred embodiment of the mounting bracket for a compact optical scanner.
Figure 12:
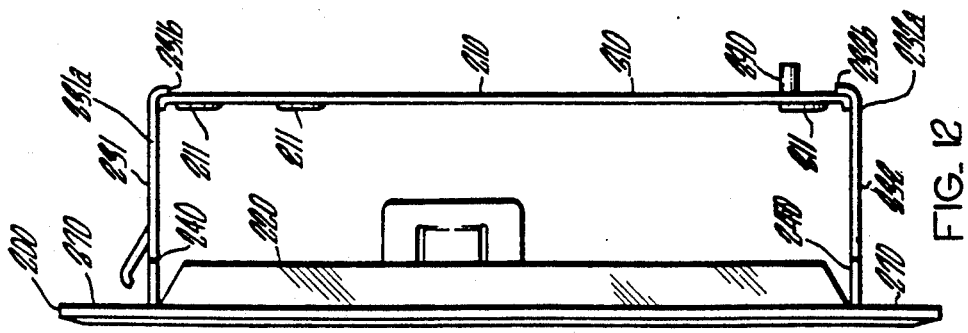
FIG. 12 is a side view of a second preferred embodiment of the mounting bracket for a compact optical scanner.
Figure 16:
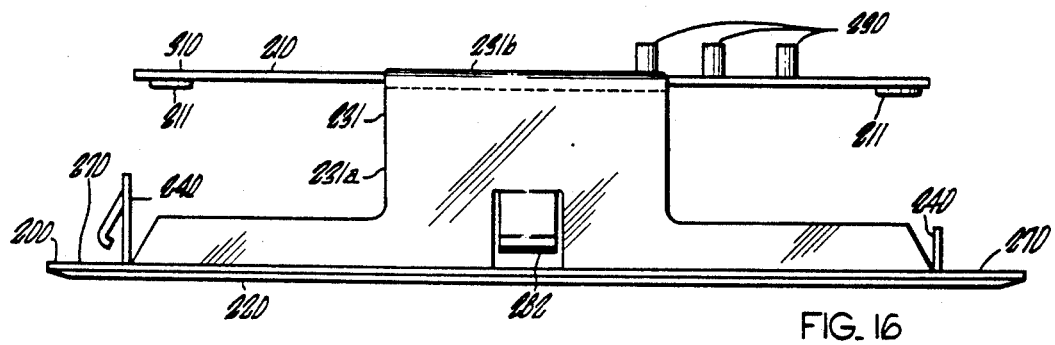
FIG. 16 is a back view of a second preferred embodiment of the mounting bracket for a compact optical scanner.
Figure 15:
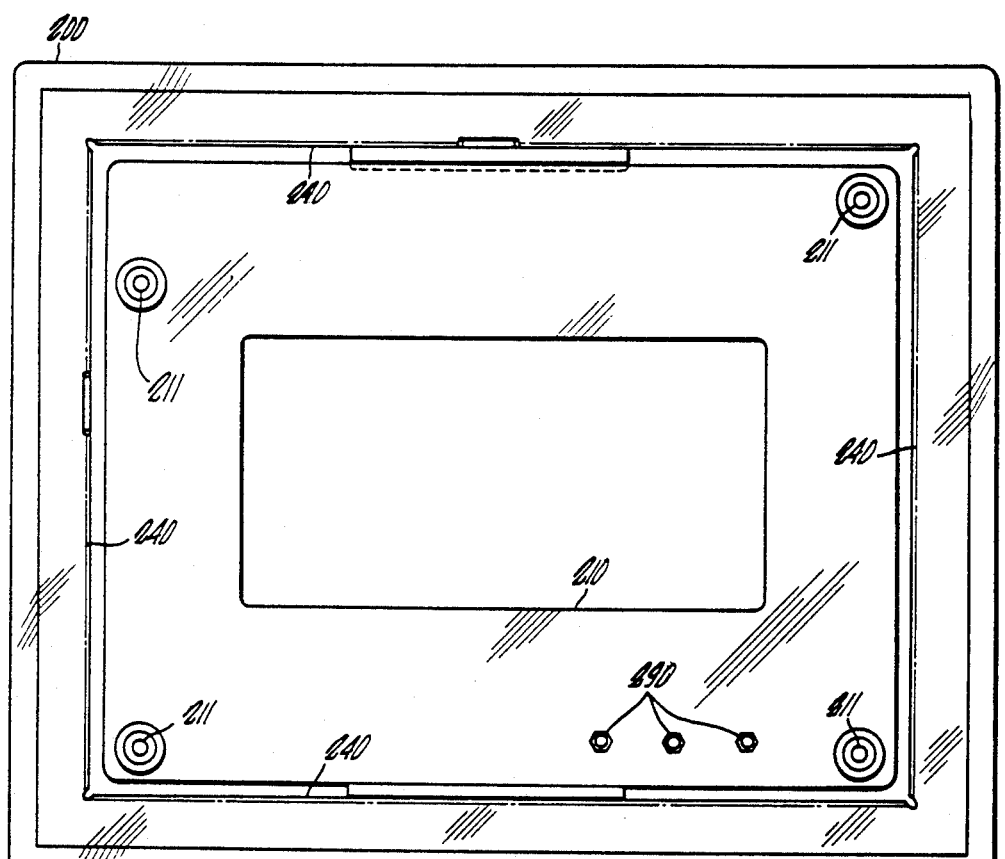
FIG. 15 is a top view of a second preferred embodiment of the mounting bracket for a compact optical scanner.
Figure 17:
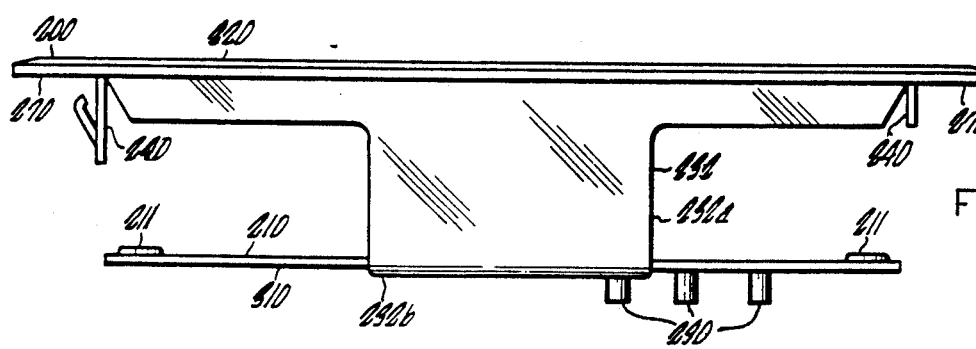
FIG. 17 is a front view of a second preferred embodiment of the mounting bracket for a compact optical scanner.

In a second preferred embodiment of the present invention as depicted in FIGS. 11-17, a mounting bracket assembly 200 for a compact optical scanner is provided. In this embodiment, the mounting bracket assembly 200 for a compact optical scanner is provided. In this embodiment, the mounting bracket assembly is constructed of two parts as shown in FIG. 11 in exploded view. The back plate 210 is attached to the optical scanner 20 (not shown in FIGS. 11-17) with fasteners such as screws or bolts through holes 211. As shown in, for example, FIG. 11, two projections or "feet" 231, 232 and provided on top plate 220. Each foot 231, 232 has a flexible extension portion 231a, 232a and a support surface portion 231b, 232b. The assembly of back plate 210 and scanner 20 may then be inserted into top plate 220 by flexing the flexible extension portions 231a, 232a of feet 231, 232 out of the way. Once inserted, the back surface 310 of back plate 210 of the assembly of back plate 210 and scanner 20 rests on support surface portions 231b and 232b. When inserted into top plate 220, scanner 20 engages an inner bracket rim 240 in the same fashion as set forth above, i.e., inner bracket rim 240 consists of four flanges which depend more than 90 degrees from top surface 300 of top plate 220. Each flange depends more than 90 degrees from top surface 300 so as to slope downwardly and outwardly from top surface 300. In a preferred embodiment, the draft angle is two degrees. This prevents removal of the scanner 20 through top opening 250 in mounting bracket 200. In a preferred embodiment the top plate 220 and back plate 210 are fabricated of stainless steel for longevity in a commercial environment. Other materials could be used as would be well known to those of skill in the art.

Mounting bracket 200 is designed to be dropped into a cutout in a surface such as a counter. In such circumstance, the cutout would be of smaller dimension than the peripheral rim 260 of top plate 220. Ideally, the cutout would allow the bracket 200 to drop through the surface so that lip 270 of bracket 200 rests on the surface adjacent the cutout and optionally clips 281, 282 may clip the bracket into position within the cutout in the surface. Optionally, cable tie off points 290 are provided as described before to provide points to tie electrical cables to for strain relief as well known in the art.

While embodiments and applications of this invention have been shown and described, it would be apparent to those of skill in the art that many more modifications are possible without departing from the inventive concepts herein. The invention, therefore, is not to be restricted except in the spirit of the appended claims.

We claim:

1. An apparatus comprising an optical scanner mounted with a bracket to an object having a first surface, a second surface and a cutout passing between said first surface and said second surface, said bracket inserted into the cutout from the first surface;

said bracket having a top surface with an opening therethrough;

said top surface including a rigid lip means for contacting the first surface and preventing the passage of said bracket entirely through said cutout;

said bracket including an inner rim portion surrounding said opening for engagement with the optical scanner having a draft angle of greater than zero degrees;

an upper surface of the optical scanner including an optical window and capable of being held flush with said top surface by the bracket;

said bracket including a plurality of feet having support surface portions;

at least one of said feet having a flexible extension portion;

said flexible extension portion normally in an unflexed position so as to preclude scanner insertion and removal and capable of being flexed to a flexed position so as to permit scanner insertion and removal;

said inner rim portion adapted to contact an outer wall of the optical scanner so that absent flexure of said flexible extension portion the optical scanner may occupy said opening without being removable therethrough.

2. The apparatus of claim 1 wherein at least one of said support surface portions additionally includes a mounting hole.

3. The apparatus of claim 2 wherein the scanner is attached to the bracket.

4. The apparatus of claim 3 wherein the bracket is attached to the first surface.

5. The apparatus of claim 1 wherein the bracket is attached to the first surface.

6. The apparatus of claim 4 wherein the bracket is fabricated of a single piece of plastic.

7. An apparatus comprising an optical scanner removably mounted with a bracket to an object having a first surface, a second surface, and a cutout passing between said first surface and said second surface, said bracket inserted into the cutout from the first surface;

said bracket having a top surface with an opening therethrough; said top surface including rigid lip means in contact with said first surface and preventing the passage of said bracket entirely through said cutout;

said bracket further comprising an inner rim portion having a draft angle of greater than zero degrees surrounding said opening and engaged with the optical scanner;

an upper surface of the optical scanner including an optical window and held flush with said top surface of said bracket; a back plate fabricated of metal;

said back plate attached to the optical scanner;

said back plate removably attached to said bracket;

a plurality of feet having support surface portions;

said back plate including a back surface adapted to rest against said support surface portions;

at least one of said feet having a flexible extension portion;

said flexible extension portion having an unflexed position and a flexed position;

said scanner precluded from insertion and removal from said mounting bracket when said flexible extension portion is in said unflexed position;

said flexible extension portion biased to said unflexed position.

8. An apparatus comprising an optical scanner mounted with a bracket to a counter surface, said optical scanner having a top surface including an optical window therethrough;

said bracket capable of fitting partially through a cutout in the counter surface;

said bracket having a top bracket surface with an opening therethrough;

said bracket including a lip means for contacting the counter surface;

said bracket including an inner rim portion having a draft angle of greater than zero degrees;

said inner rim portion adapted to contact an outer wall of the optical scanner so as to prevent the optical scanner from being removable through said opening in said top bracket surface;

said bracket including a plurality of feet having support surface portions;

at least one of said feet having a flexible extension portion;

said flexible extension portion normally in an unflexed position so as to preclude scanner insertion and removal and capable of being flexed to a flexed position so as to permit scanner insertion and removal.

9. The apparatus of claim 8 wherein said optical window is adapted to be mounted substantially flush with the counter surface.

* * * * *